May 2, 1939. W. J. LUTEY 2,156,816
RESILIENT CROSS STRAPS FOR TIRE CHAINS
Filed June 28, 1938
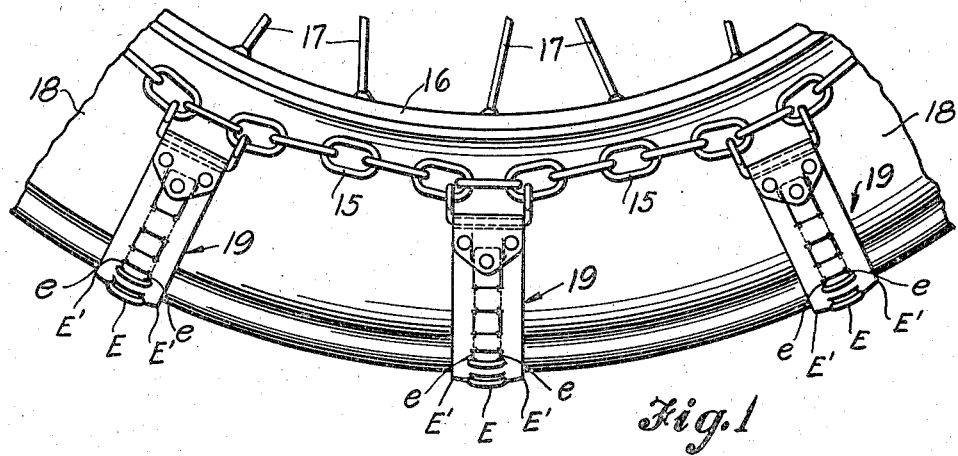
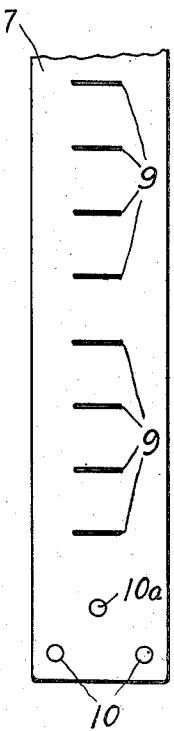
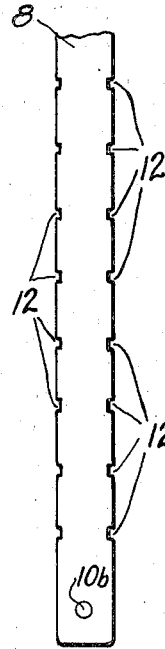
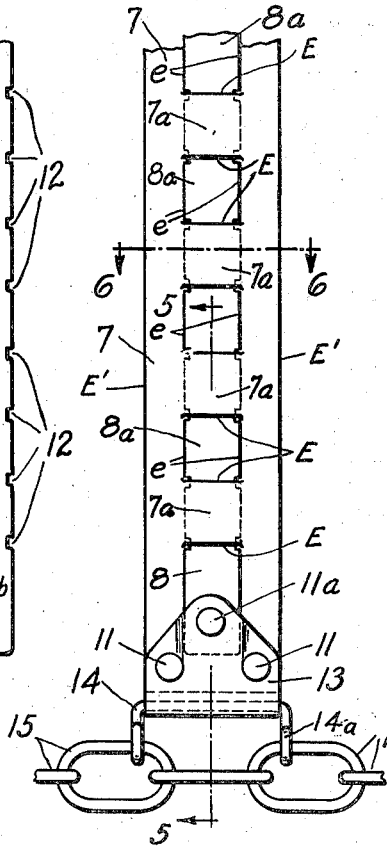
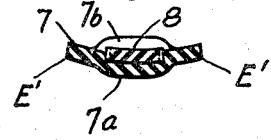
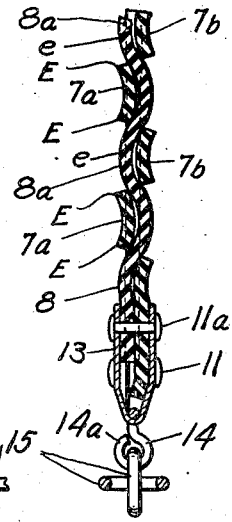
INVENTOR.
William J. Lutey
BY Robert L. Rockwell
ATTORNEY.

Patented May 2, 1939

2,156,816

UNITED STATES PATENT OFFICE 2,156,816

RESILIENT CROSS STRAPS FOR TIRE CHAINS

William J. Lutey, Seattle, Wash.

Application June 28, 1938, Serial No. 216,240

6 Claims. (Cl. 152—221)

This invention relates to improvements in cross straps for tire chains in general, and in particular to cross straps for said chains, made in a novel manner from inexpensive resilient materials to impart special non-slip characteristics, and used as a substitute for the well known metal cross links.

The preferred embodiment of the invention herein disclosed, comprises a relatively wide strip of strong, tough, pliable material, in which a plurality of transverse spaced apart apertures are cut; and a relatively narrow strip of similar material, preferably having notches in the edge portions thereof that are adapted to engage the end portions of the slots in said wide strip, when said narrow strip is woven back and forth through successive said slots. Any suitable means may be employed to fixedly secure the corresponding ends of said strips to each other, and to removably secure the ends of the completed cross strap to a pair of suitable side chains.

This disposition of the two strips of material results in the formation of a cross strap for tire chains, that has a plurality of raised edge portions, so disposed that they are particularly effective in preventing slippage in all directions. They are outstandingly effective, however, in preventing side slippage of the tires on which they are mounted. For this reason they are especially adapted for use on the front wheels of automotive vehicles to assure steering and braking traction on wet, muddy or frosty paving, in soft mud, loose sand, snow, or wherever increased traction for steering and braking is required.

An object of the invention is to provide a cross strap for tire chains in which the materials of construction are combined in a novel manner to impart new and improved non-skid characteristics.

Another object is to provide an improved article of the kind described in which the construction is such that the natural curvature of the material used, and the mode of combining the component parts, provide a single thickness of said material at the leading and following edges, and form a plurality of continuous transverse ridges from edge to edge, thereby greatly reducing the vibration transmitted to the steering wheel when driving on hard surfaced roads.

A further object is to provide an improved article of the kind described in which the longitudinal slippage of the wheels protected thereby, is greatly reduced for soft road formations, by using the reverse side of the cross straps comprising the tire chains.

A still further object is to provide a cross strap for tire chains of improved flexibility that may be made easily and quickly from inexpensive materials.

Other objects and advantages will be apparent to those skilled in the art, from the following detailed description of a preferred form of the invention, which consists of certain parts in cooperative combination, hereinafter described, illustrated in the accompanying drawing, and embraced in the appended claims.

In the drawing:

Figure 1 is a fragmentary side elevation of a wheel equipped with tire chains comprising the cross straps of my invention;

Fig. 2 is a plan view of a portion of the length of a wide strip, after the slots and holes have been punched;

Fig. 3 is a plan view of a corresponding portion of the narrow strip after the edge notches and holes have been punched;

Fig. 4 is a plan view of the aforesaid strip portions after being assembled, showing one form of end yoke and link for fastening the assembled cross strap to the side chains;

Fig. 5 is a sectional medial elevation taken on broken line 5—5 of Fig. 4; and

Fig. 6 is a transverse section through the cross strap taken on broken line 6—6 of Fig. 4.

Like reference numerals are used to indicate like parts throughout the drawing, wherein the wide strip is indicated by the numeral 7 and the narrow strip by the numeral 8.

Referring particularly to Fig. 2, it will be seen that a plurality of narrow transverse slots 9 are provided preferably medially of strip 7 in spaced apart position. Holes 10 and 10a are punched near each end to receive rivets 11 and 11a, as hereinafter explained.

Strip 8 is provided with a plurality of notches 12, so arranged and spaced longitudinally that each transverse pair of notches will fit at the ends of a corresponding slot 9 in strip 7, when said strips are assembled as shown in Figs. 4, 5 and 6.

To facilitate weaving strip 8 through slots 9, I find it desirable to employ special clamps (not shown) to engage the respective side portions of strip 7; said clamps being so arranged that they then can be separated to stretch the resilient material, thereby elongating the slots to facilitate weaving strip 8 through them so the notches therein will be positioned opposite the ends of the slots. The separation of said clamps is then reduced to normal and the clamps released.

The contraction of the elongated slots causes them to close upon the narrow strip at the bottoms of each aforesaid pair of notches, thereby holding the two interwoven elements firmly together.

By means of this construction I am able to employ wider portions of material at the ends of the slots for a given width of finished strap, thereby considerably increasing its longitudinal strength. Furthermore, the material of strip 8 between each pair of notches is thus allowed to move independently of the other said sections to increase the effectiveness of the grip of the sharp edges on the road when greater traction is required, as when making emergency stops.

After the strips are assembled the arrangement is such that previously punched holes 10b of strip 8 will coincide with holes 10a of strip 7.

End yokes 13 may be formed from sheet metal and provided with holes corresponding to holes 10, 10a and 10b. After the strips have been assembled, said yokes, with their associated metal U-links 14 in place as shown, are slipped over the ends of the assembled strips and fixedly secured thereto by means of rivets 11 and 11a, thus completing the assembly.

Eye ends 14a of the U-links are left open until ready to fixedly secure the cross straps to side chains 15. This may be done in either the factory or repair shop by hooking said eye ends into and closing them around the links of said side chains, as shown clearly in Figs. 4 and 5.

Fig. 1 illustrates a fragmentary side elevation of a wheel having a metal rim 16, wire spokes 17 and tire 18, equipped with a tire chain comprising side chains 15 and a plurality of my cross straps, represented as a whole by the numeral 19.

Any number of the cross straps may be used to best meet the needs of a given class of service. I find, however, that fewer cross straps are required for equivalent results, than when metal cross links are used.

By combining the several elements of the cross strap, as herein illustrated and described, it will be seen clearly in Figs. 4 and 5 that sections 7a of strip 7 are turned outwardly by strip 8, so that sharp edges E are forced into contact with the road surface as the wheel rolls over the strip, thus providing great resistance to lateral skidding of the wheels in either direction.

In like manner the sections 8a of strip 8 are held outwardly by sections 7b of strip 7, and the sharp edges e thereof, together with edges E' of strip 7, are forced into contact with the road surface by the wheel load to provide resistance to longitudinal skidding when applying the brakes or accelerating under power.

Referring to Figs. 1 and 6, it will be seen that the wide strip has a pronounced transverse curvature. This is the natural curvature of the strip when cut circumferentially from old pneumatic tire casings, which I have found to be both satisfactory and inexpensive for this service.

Where the surface of the road to be traversed is relatively hard, I prefer to apply the tire chains with the concave side of strip 7 next to the tire, as shown in Fig. 1. In this case the side edges of the cross strap tend to lay close to the tire, and the outwardly disposed sections 7a between the slots cooperate therewith to provide a plurality of continuous transverse ridges from edge to edge. By means of this construction the vibration transmitted to the vehicle, particularly the steering wheel, is greatly reduced.

Where the driving conditions are unusually bad and increased traction for steering and braking is required, the longitudinal slippage of the wheels may be decreased by applying the tire chains so the reverse sides of the cross straps will contact the road. In this case the concave side of the straps will be out, and the out-turned side edges of strap 7 become effective in providing a better longitudinal non-slip grip on the road.

It will be apparent from the foregoing description, that the transverse slots and woven relation of the two strips comprising my cross straps cooperate to provide great flexibility for a given width of strap and thickness of material, thereby making the tire chains comprising them easy to install and assuring a snug fit on the tires. Furthermore, it will be seen that the construction is such that my cross straps may be made easily and quickly from inexpensive materials, thus assuring an effective yet inexpensive substitute for the metal cross links of tire chains.

It will be apparent, also, that the essential cooperative elements thereof may be constructed and combined in various other equivalent forms, made from other materials and used for other purposes, without departing from the scope of the invention defined by the appended claims.

Having illustrated and described a preferred form of my invention, what I claim as new and desire to protect by Letters Patent is:

1. In a cross strap for tire chains, the combination of a strip of resilient material having a plurality of transverse slots, and another strip of resilient material woven through the successive slots of said first named strip.

2. In a cross strap for tire chains, the combination of a wide strip of resilient material having a plurality of medially disposed transverse slots, and a narrow strip of resilient material woven in alternate directions through the successive slots of said wide strip.

3. In a cross strap for tire chains, the combination of a wide strip of resilient material having a plurality of spaced apart transverse slots, and a narrow strip of resilient material woven in alternate directions through the successive slots of said wide strip, said narrow strip having edge notches engaging the material at the ends of the slots in said wide strip.

4. In a cross strap for tire chains, the combination of a wide strip of resilient material having a plurality of transverse slots, a narrow strip of resilient material woven through the successive slots of said wide strip, and terminal means fixedly secured jointly to the end portions of said wide and narrow strips.

5. In a cross strap for tire chains comprising a pair of side chains, the combination of a wide strip of resilient material having a plurality of transverse slots, a narrow strip of resilient material woven through the successive slots of said wide strip, terminal means fixedly secured to the adjacent end portions of said wide and narrow strips, and link means for fixedly securing said terminal means to said side chains.

6. In a cross strap for tire chains comprising a pair of side chains, the combination of a wide strip of resilient material having a plurality of transverse slots, a narrow strip of resilient material woven through the successive slots of said wide strip, said narrow strip having edge notches adapted to engage the material at the ends of the slots in said wide strip, a terminal yoke fixedly secured jointly to the adjacent end portions of said wide and narrow strips, and link means for fixedly securing said terminal means to said side chains.

WILLIAM J. LUTEY.